(12) United States Patent
Mäkelä et al.

(10) Patent No.: US 8,135,008 B2
(45) Date of Patent: Mar. 13, 2012

(54) NETWORK NODE AND METHOD FOR TRANSMITTING IP PREFIX INFORMATION IN MESSAGING SIGNALS

(75) Inventors: Antti Mäkelä, Tampere (FI); Jouni Korhonen, Riihimäki (FI)

(73) Assignee: TeliaSonera AB, Stockholm (SE)

( * ) Notice: Subject to any disclaimer, the term of this patent is extended or adjusted under 35 U.S.C. 154(b) by 230 days.

(21) Appl. No.: 12/322,975

(22) Filed: Feb. 10, 2009

(65) Prior Publication Data

US 2009/0207856 A1   Aug. 20, 2009

(30) Foreign Application Priority Data

Feb. 15, 2008   (FI) ...................................... 20085138

(51) Int. Cl.
*H04L 12/56* (2006.01)
(52) U.S. Cl. .......................... 370/389; 370/465; 370/475
(58) Field of Classification Search .................. 370/389, 370/395, 464, 465, 475, 476
See application file for complete search history.

(56) References Cited

U.S. PATENT DOCUMENTS 7,301,945 B1 *  11/2007  Ooms et al. ................... 370/390
2005/0041675 A1   2/2005  Trostle et al.

OTHER PUBLICATIONS

Devarapalli, V. et al., 'Network mobility (NEMO) Basic Support Protocol', Network Working Group, RFC 2963, Standards Track, Jan. 2005, sivut 1-33, koko julkaisu.
Makela, A. et al., 'Home Agent assisted Route Optimization between Mobile IPv4 Networks', Network Working Group, IETF Standard-working-Draft, 20080222, Internet Engineering Task Force, IETF, CH sivut 1-37, luku 4.1.

* cited by examiner

*Primary Examiner* — Pao Sinkantarakorn
(74) *Attorney, Agent, or Firm* — Cozen O'Connor

(57) ABSTRACT

In order to reduce the size of a signaling message advertising prefixes, a super block prefix is determined amongst two or more prefixes having a common pattern. Information on the super block prefix and delta information on each non-super-block prefix is used in the messages instead of the prefixes as such, the delta information indicating how the prefix differs from the super block prefix.

17 Claims, 5 Drawing Sheets

NETWORK NODE AND METHOD FOR TRANSMITTING IP PREFIX INFORMATION IN MESSAGING SIGNALS

FIELD

The invention relates to address-related information transmitted in signaling messages, and especially to IP prefixes transmitted in signaling messages.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

The evolvement of communication technology, particularly IP-based (IP, Internet Protocol) communication technology and end user terminals, has enabled versatile communication possibilities, including a mobile IP with mobile networks. The Internet edge mobility allows a host, such as a mobile portable IP-enabled device, to change its point of attachment to the Internet but still be identifiable through the same IP address. A mobile network is a subnet that can change its point of attachment to the routing infrastructure. The mobility of a network is provided by a mobile router, which provides connectivity and reachability as well as session continuity for all the nodes in the mobile network behind the mobile router, the nodes being either hosts or other mobile routers forming a nested network. This mechanism is called network mobility (NEMO). In NEMO, instead of assigning single IP addresses to single nodes, one or more IP prefixes are assigned to a mobile router. This allows a subnet behind the mobile router and a group of hosts attached to the subnet to be identifiable through the same IP prefix. (An IP prefix defines a set of IP addresses and in IPv4 the prefix may also be called a network address.) The mobile router typically serves as a default gateway for the hosts on the mobile network and the mobile router needs to register and update its point of attachment to its home agent so that the home agent will be aware of the network behind the mobile router and the associated IP prefixes. This signaling establishes a bi-directional tunnel between the home agent and the mobile router, the tunnel making the network movements transparent to the mobile nodes behind the mobile router and ensuring that traffic sent to the host's IP address will arrive at the intended node.

For route propagation, the home agent advertises mobile networks known by the home agent to other mobile routers. For example, during registration, a joining mobile router may request information on route optimizable networks from the home agent and may receive in a registration response zero or more prefix advertisements extensions, the extensions informing the mobile router on all known existing registered mobile networks and the mobile routers that manage them. If hundreds of mobile routers share the same home agent, transmitting prefixes in a corresponding number of extensions, consumes bandwidth since each prefix requires a separate extension.

SUMMARY

An object of the present invention is to provide prefix information in a more compact way in order to minimize the bandwidth consumption. The object of the invention is achieved by methods, network nodes, a system and a computer program product which are characterized by what is stated in the independent claims. The preferred embodiments of the invention are disclosed in the dependent claims.

An aspect of the invention utilizes a common pattern in prefixes to reduce the size of one or more of the extensions, and thereby reduce the size of the message carrying the prefix information. This has an advantage that the same amount of information can be transmitted in a smaller signaling message which requires less bandwidth than a prior art signaling message.

LIST OF DRAWINGS

Embodiments of the present invention are described below, by way of example only, with reference to the accompanying drawings, in which FIG. 1 shows the general architecture of a communication system;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any network node, corresponding component(s), and/or to any communication system or any combination of different communication systems that transmit IP prefixes, or corresponding information, in signaling messages. The communication system may be a fixed communication system or a wireless communication system or a communication system utilizing both fixed networks and wireless networks. The protocols used, the specifications of communication systems and network nodes, especially in wireless communication, develop rapidly. Such a development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on NEMO and home agent-assisted route optimization between mobile networks, each mobile network having a mobile router as a gateway, without restricting the embodiment to such an architecture, however.

Figure 1:
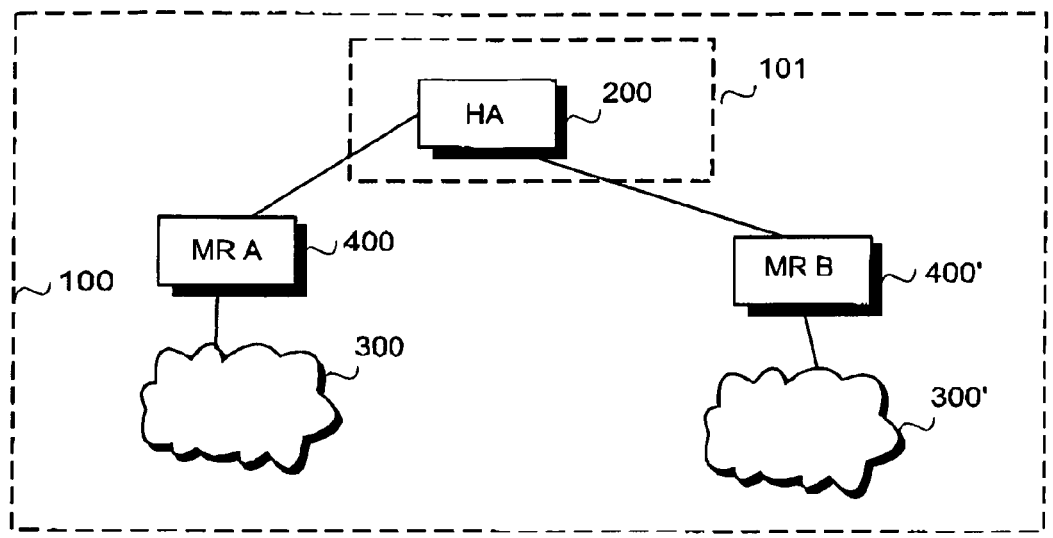

A general architecture according to an embodiment is illustrated in FIG. 1. FIG. 1 is a highly simplified system architecture only showing some elements, networks and functional entities, all being logical units whose implementation may differ from what is shown. The connections shown in FIG., 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not be discussed in more detail here.

A system 100 illustrated in FIG. 1 comprises a service provider's back-end system 101, the back-end system comprising a home agent 200 and an IP address pool (not shown in FIG. 1), wherefrom IP addresses can be distributed to mobile routers 400, 400', each mobile router providing attachment points to nodes (not shown in FIG. 1) and forming a mobile network 300, 300'. The functionalities of the home agent and the mobile router according to embodiments will be described below in more detail.

Figure 2:
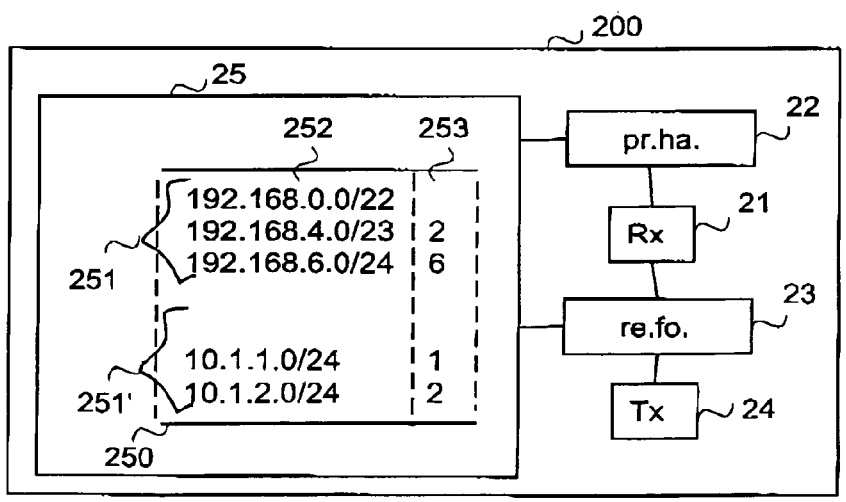
FIG. 2 is a simplified block diagram of a network node according to an embodiment.

FIG. 2 is a simplified block diagram of a network node according to an embodiment. The network node may be any node configured to send prefix information in a signaling message. An example of such a node is the above-described home agent. Below, this type of network node is called, for the sake of clarity, a home agent. Although the home agent has been depicted as one entity, different modules and memory may be implemented in one or more physical or logical entities.

The home agent 200 is configured to advertise to a mobile router other mobile routers or corresponding mobile networks. For this purpose, the home agent comprises a receiving unit 21 for receiving registration requests and re-registration requests from mobile routers, the requests containing prefix information on a requesting mobile router, a prefix handling unit 22 for storing prefix information, a response forming unit 23 for providing responses to the requests, a sending unit 24 for sending the responses and a memory 25 for storing prefixes. It should be appreciated that the home agent may comprise other units. However, they are irrelevant to the actual invention and, therefore, they need not be discussed in more detail here. Further, units illustrated in FIG. 2 are logical units whose implementation and connections may differ from what is shown.

The prefix handling unit 22 is configured to store the received prefixes to the memory 25, more precisely in a prefix table 250 in the memory. The prefix table is a list of mobile network prefixes indexed by the home addresses of mobile routers and it is used by the home agent to determine which prefixes belong to a particular mobile router. However, those associations are not illustrated in FIG. 2. According to the illustrated embodiment, the prefix table 250 associates each prefix 252 with an indication 253 whether or not it is a super block. If the prefix is not a super block, the indication 253 is a delta value for the super block. The super block may be indicated by not having a delta value, as in the example in FIG. 2, or by a specific super block indicator. As can be seen from FIG. 2, the prefixes comprise the IP address sequence in a four-part-dotted-portion, a slash and length information, the four-part-dotted-portion being a binary number broken into four octets. The length information indicates the shared initial bits, counted from the left-hand side.

In the illustrated embodiment, the prefix handling unit 22 is configured, in response to a received prefix that is not in the memory, to check whether the received prefix can be added to an existing "prefix family" 251, 251' or to form with an existing prefix a prefix family, or whether it is a single prefix, i.e. whether the received prefix has a common pattern with an existing prefix. In other words, by detecting that two or more prefixes begin with a common portion of a predetermined length, a prefix family is detected. The rules on the basis of which prefixes are considered to form a prefix family can be defined network node-specifically and the invention does not restrict them. An example of such a rule or a set of rules is that in the case of variable-length prefixes, the prefix with the longest common prefix is selected to be the super block, and that prefixes belonging to the same family have a predetermined number of the same bits starting from the beginning (i.e. from the left-hand side). A definition for a family may be that family members share the same first two octets (i.e. the first 16 bits), for example. A further rule could be that within a family every $7^{th}$ prefix is a super block to restart the delta encoding, for example.

If the prefix is a single prefix, the prefix handling unit 22 is configured to indicate the prefix as a "super block". If the prefix becomes a member of a prefix family, the prefix handling unit preferably checks, whether the prefix will be the super block of the family, and if the received prefix is to be the super block of the family, indicates the prefix as the super block, and update deltas of the other prefixes (including adding delta to the previous super block) in the family to be in accordance with the new super block. If the received prefix is a "delta member" of the family, the prefix handling unit calculates the delta for the super block and stores the prefix with its delta. An advantage of this indication is that it suffices to decide a super block and calculate deltas only when some new information is added or some old information is removed, the indications being ready and usable for advertisement purposes, as will be described later.

Figure 3:
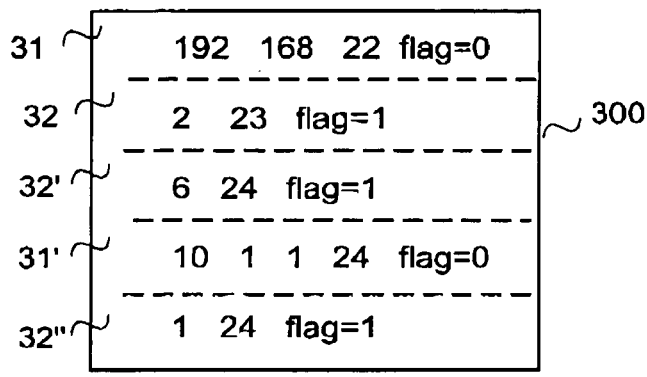
FIG. 3 illustrates message contents according to an embodiment.

In the embodiment, the response forming unit is configured to utilize the information in the prefix table 250 when forming the prefix advertisement extensions in a signaling message (a response) illustrated in FIG. 3. FIG. 3 is a simplified block diagram of signaling message contents according to an embodiment. In the example, the illustrated message 300 is formed, in a manner described below, by the response forming unit from the data stored in the memory and illustrated in FIG. 2. For the sake of clarity, the header information of the message is not shown, only the extensions 31, 32, 32', 31', 32" are shown.

The response forming unit according to the embodiment is configured to use delta encoding using octet granularity or bit-wise encoding without restricting the forming of extensions to such solutions. It should be appreciated that any suitable implementation can be used.

Referring to FIG. 3, the response forming unit is configured to start from a super block, to truncate out from the super block zeros after the last number one in binary format and starting from the left-hand side, or octets having the value zero from the right-hand side until a first octet with no zero is met, and add to the extension 31 the non-truncated bits of the prefix, possibly padded to be a full octet, or the non-truncated octets of the prefix, the prefix length and a flag value indicating that this is a super block. Padding, i.e. adding zeroes to the end, can be used to obtain full octets in implementations requiring full octets. (However, there are implementations not requiring full octets.) The next extension 32 only contains the delta value compared to the superblock, possibly padded to be an octet, the length of the prefix and a flag value indicating that this is a delta. The same is performed to all prefixes in the prefix table. Compared to a prior art solution, in which each extension contained the four octets of the prefix and the length, each super block in the illustrated example saves at least one octet and each delta value three octets, thereby reducing the message size significantly. It should be noted that the message is reduced even if there is only one prefix to be advertised (in which case the prefix is a super block and there is only a super block extension in the message).

In another embodiment, the super block is not truncated, i.e. the prefix is sent as the super block.

In an embodiment, the prefix handling unit does not calculate and store the deltas and the above-described indications are not stored in the prefix table. An advantage of the embodiment is that the no changes are required to the prior art prefix handling units that are capable of indexing prefixes. In the embodiment, the response forming unit is configured to perform the required delta calculations and super block recognitions each time the prefixes are advertised.

In a further embodiment, the prefix handling unit does not calculate and store the deltas but stores a specific super block indicator for a superblock in the prefix table.

In another embodiment, the prefix handling unit stores the prefix families as delta-encoded. In other words, the prefix families are stored so that the super block is stored as such, whereas the other prefixes are not stored as such but instead a delta to the super block and the prefix length are stored. An advantage of the embodiment is that it needs less memory. However, in the embodiment, the prefix handling unit needs to be configured to resume a prefix if the super block prefix is deregistered and a new super block needs to be determined.

In an embodiment, no delta encoding is utilized but all prefixes are truncated and sent as if they all were super blocks. In the embodiment, the flag may be left out.

It is apparent from the above that it suffices to send information on prefixes with which information the prefix can be re-assembled.

A home agent or a corresponding network node implementing one or more functions of a corresponding home agent described in an embodiment comprises not only prior art means but also means for implementing the one or more functions of a home agent described in an embodiment, and it may comprise separate means for each separate function, or means may be configured to perform two or more functions. The home agent may be configured as a computer or a microprocessor, such as a single-chip computer element, including at least a memory for providing storage area used for arithmetic operation and an operation processor for executing the arithmetic operation. Present home agents comprise processors and memory that can be utilized when implementing an embodiment. The memory may be a removable memory detachably connected to the home agent. For example, the prefix handling unit 22 or the response forming unit 23 or a combination of these may be a software application, or a module, or a unit configured as arithmetic operation or as a program (including an added or updated software routine) executed by an operation processor, such as a central processing unit. An embodiment provides a computer program embodied on any home agent—readable distribution/data storage medium, comprising program instructions which, when loaded into a home agent, constitute the response forming unit. Programs, also called program products, including software routines, applets and macros, can be stored in any medium and may be downloaded into the home agent. In other words, all modifications and configurations required for implementing one or more functions of an embodiment may be implemented as added or updated software routines, application circuits (ASIC) and/or programmable circuits.

Figure 4:
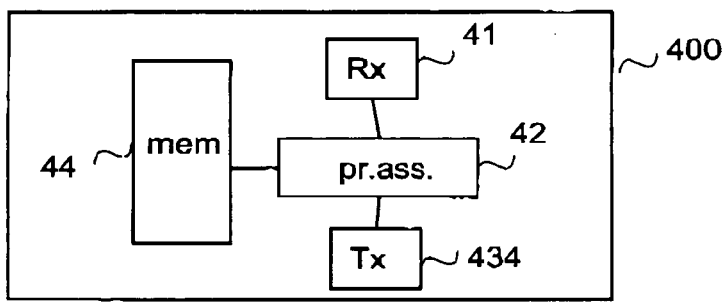
FIG. 4 is a simplified block diagram of a router according to an embodiment.

FIG. 4 is a simplified block diagram of a network node according to an embodiment. The network node may be any node configured to receive prefix information in a signaling message, such as a mobile router or a router. Below the network node is called, for the sake of clarity, a mobile router. Although the mobile router has been depicted as one entity, different modules and memory may be implemented in one or more physical or logical entities.

The mobile router 400 is configured to receive prefixes of other mobile routers or corresponding mobile networks in a signaling message. For this purpose, the mobile router comprises a receiving unit 41 for receiving responses to registration requests and re-registration requests, the responses preferably containing prefix information on a corresponding mobile router, a prefix assembly unit 42 for processing the received prefix information, a sending unit 43 for sending registration requests and re-registration requests, the requests containing an explicit request for prefix information, such as a route preferably optimization request, and a memory 44 for storing the prefixes or corresponding information. It should be appreciated that the mobile router may comprise other units used in or for providing mobile networks. However, they are irrelevant to the actual invention and, therefore, they need not to be discussed in more detail here.

In an embodiment, the prefix assembly unit 42 is configured to reassemble the prefix information received in the extensions described above with FIG. 3 to the actual prefixes and to maintain them in a route optimization cache in the memory 44 in order to have information on the route-optimizable networks, i.e. information on all existing known networks of the same home agent and the mobile routers that manage the networks. The prefix assembly unit 42 is configured to detect which extension relates to a super block and which to a delta block on the basis of the flag values; to read the bits in a super block from the beginning (left-hand side), possibly adding zeroes to the end as padding bits to obtain full octets, if full octets are required by the implementation and to store the reassembled prefix in a four-part-dotted-form with the flash and the length in the cache, and in response to a delta block, to search for the previous super block in the message and to reassemble (calculate) the prefix using the super block and delta information, the delta information comprising a delta and length information, and to store the thus obtained prefix with its length information in the cache. The length information indicates the number of the bit, counted from the beginning, i.e. from the left-hand side, which is going to be the last bit of the bits to be added/changed, which are determined on the basis of the delta.

In another embodiment, the prefix assembly unit 42 is configured to store the prefix information in the cache in the form it was received, and only when the actual prefix information is needed, to calculate the prefixes.

In the embodiment where no delta encoding is utilized but all prefixes are sent as super blocks, the prefix assembly unit 42 is configured to read the bits in prefixes from the beginning (left-hand side), possibly adding to the end zeroes as padding bits to obtain full octets, if full octets are required by the implementation.

A mobile router or a corresponding mobile or non-mobile network node, such as a fixed IP router or a host receiving prefix advertising messages, implementing one or more functions of a corresponding mobile router described in an embodiment comprises not only prior art means but also means for implementing the one or more functions of a mobile router described in an embodiment, and it may comprise separate means for each separate function, or means may be configured to perform two or more functions. The mobile router may be configured as a computer or a microprocessor, such as a single-chip computer element, including at least a memory for providing storage area used for arithmetic operation and an operation processor for executing the arithmetic operation. Present mobile routers comprise processors and memory that can be utilized when implementing an embodiment. The memory may be a removable memory detachably connected to the mobile router. For example, the prefix assembly unit 42 may be a software application, or a module, or a unit configured as arithmetic operation or as a program (including an added or updated software routine) executed by an operation processor, such as a central processing unit. An embodiment provides a computer program embodied on any mobile router-readable distribution/data storage medium, comprising program instructions which, when loaded into a mobile router, constitute the response forming unit. Programs, also called program products, including software routines, applets and macros, can be stored in any medium, and may be downloaded into the mobile router. In other words, all modifications and configurations required for implementing one or more functions of an embodiment may be implemented as added or updated software routines, application circuits (ASIC) and/or programmable circuits.

Figure 5:
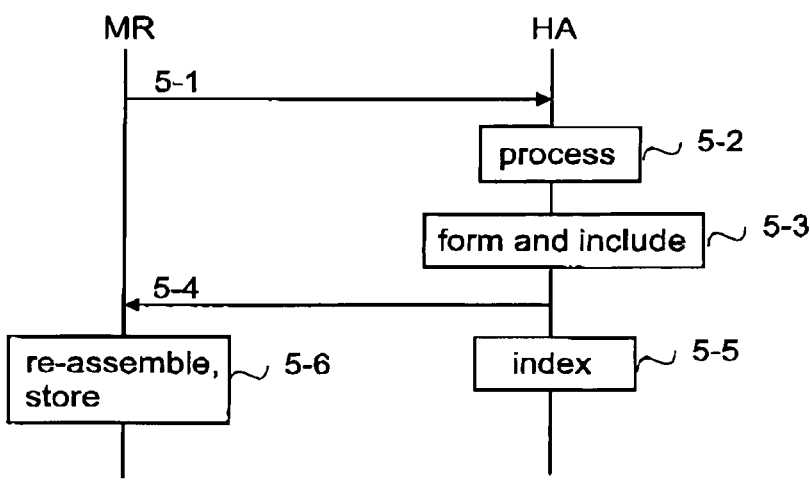
FIG. 5 illustrates signaling according to an embodiment.

FIG. 5 illustrates a situation in which the home agent advertises mobile networks which the home agent has information to a mobile router for the route propagation. In the embodiment illustrated in FIG. 5, it is assumed that a mobile router MR's registration request is successful.

FIG. 5 starts when a mobile router MR sends a registration request in message 5-1 to the home agent HA, the registration request containing a route optimization request. In response to the message 5-1, the home agent HA processes, in point 5-2, the registration request (i.e. conducts authorization and authentication procedures), and since the registration request is successful and contained the route optimization request, the home agent HA forms and includes, in point 5-3, in a registration request response zero or more route optimization prefix advertisement extensions, the extensions being formed according to an embodiment described above, and then sends the registration request response in message 5-4 to the mobile router MR. Meanwhile the home agent HA also indexes, in point 5-5, the mobile router's prefix received in message 5-1 to the prefix table in a manner described above.

When the mobile router MR receives message 5-4, it reassembles, in point 5-6, the prefixes using the super block and delta information in the extensions of message 5-6, and stores, in point 5-6, the reassembled prefixes. Now the mobile router MR is informed of all existing networks and mobile routers that manage them, and can perform route optimization procedures.

Although it is assumed in the above that a mobile network is explicitly identified by a mobile router, the mobile networks, or more precisely the corresponding IP prefixes, may be implicitly configured on the home agent.

Although it is assumed in the above that prefix information is delivered during a registration or re-registration phase in a form of a prefix advertisement and on a specific request from the mobile router, one skilled in the art may easily employ the embodiments in situations in which the prefix information is delivered during another phase and/or without a specific request and/or in another form than an advertisement.

The points, signaling messages and related functions described above in FIG. 5 are in no absolute chronological order, and some of the points may be performed simultaneously or in an order differing from the given one. Other functions can also be executed between the points or within the points and other signaling messages sent between the illustrated messages. The signaling messages are only exemplary and may even comprise several separate messages for transmitting the same information. In addition, the messages may also contain other information.

It should be appreciated that one network node may comprise the above-described home agent functionality and mobile router functionality.

Figure 6:
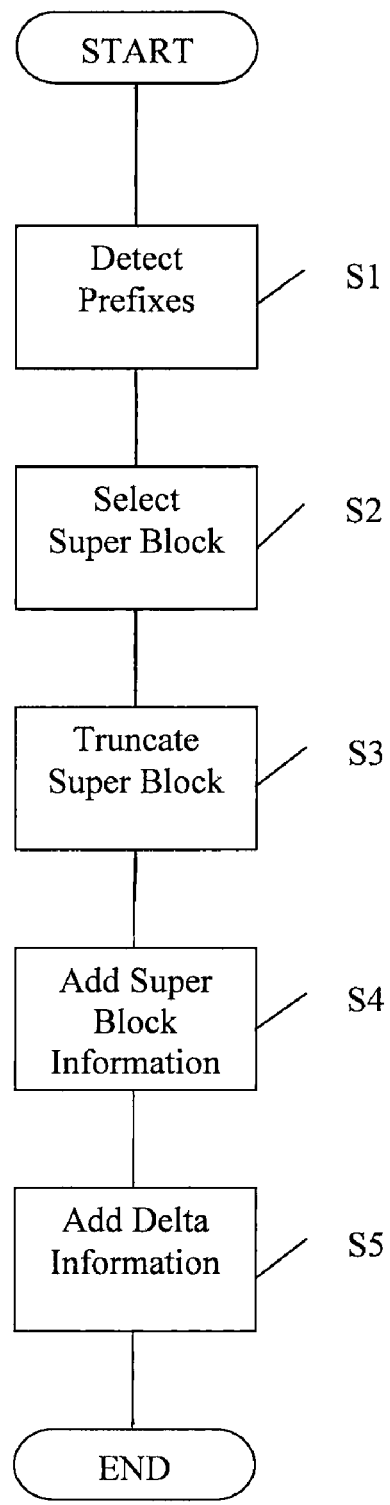
FIG. 6 is a flow diagram of a method according to an embodiment.

A method for forming a signaling message delivering prefix information is shown in FIG. 6 and includes detecting that two or more prefixes have a common pattern to detect a prefix family (step S1). One of the prefixes is selected to be a super block prefix (step S2). The super block prefix is truncated as described above (step S3). Furthermore, the other prefixes are described as a delta value describing how the other prefixes differ from the super block prefix. Information on the super block prefix is added to the signaling message (step S4) and information on the delta value for the other prefixes is added to the signaling message (step S5).

Figure 7:
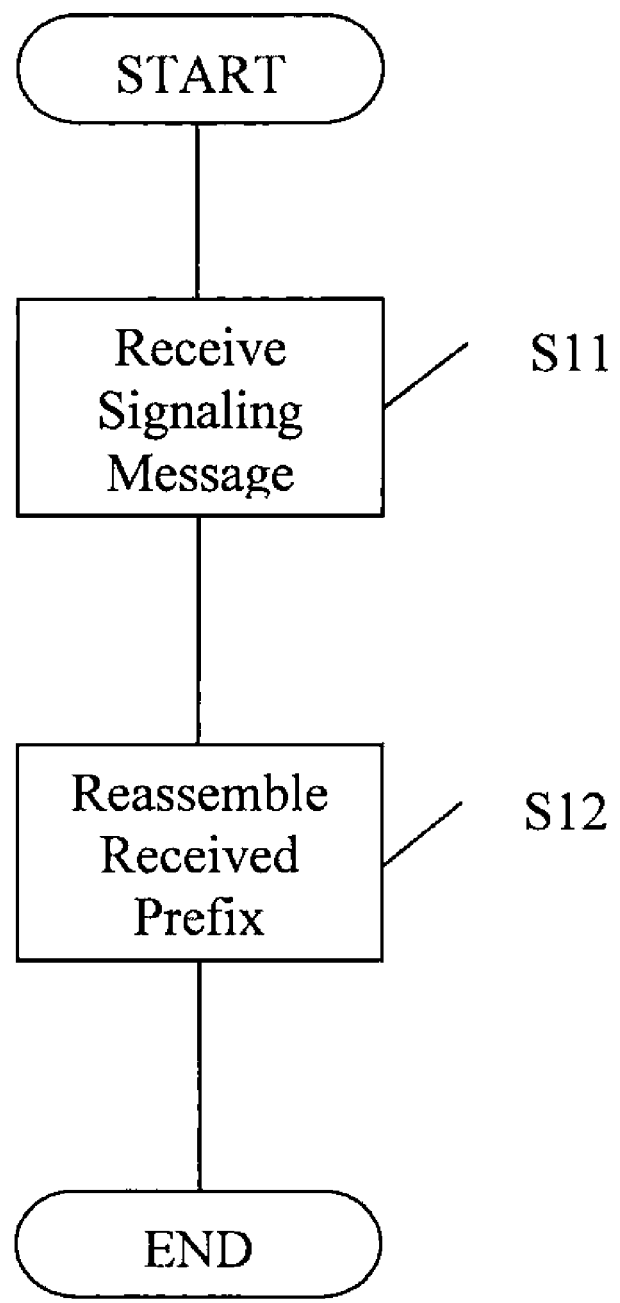
FIG. 7 is a flow diagram of a method according to another embodiment.

A method of obtaining prefix information is disclosed in FIG. 7 and includes receiving a signaling message with a truncated prefix and length information (step S11) and reassembling the receiving prefix (step S12) based on the truncating described above.

Figure 8:
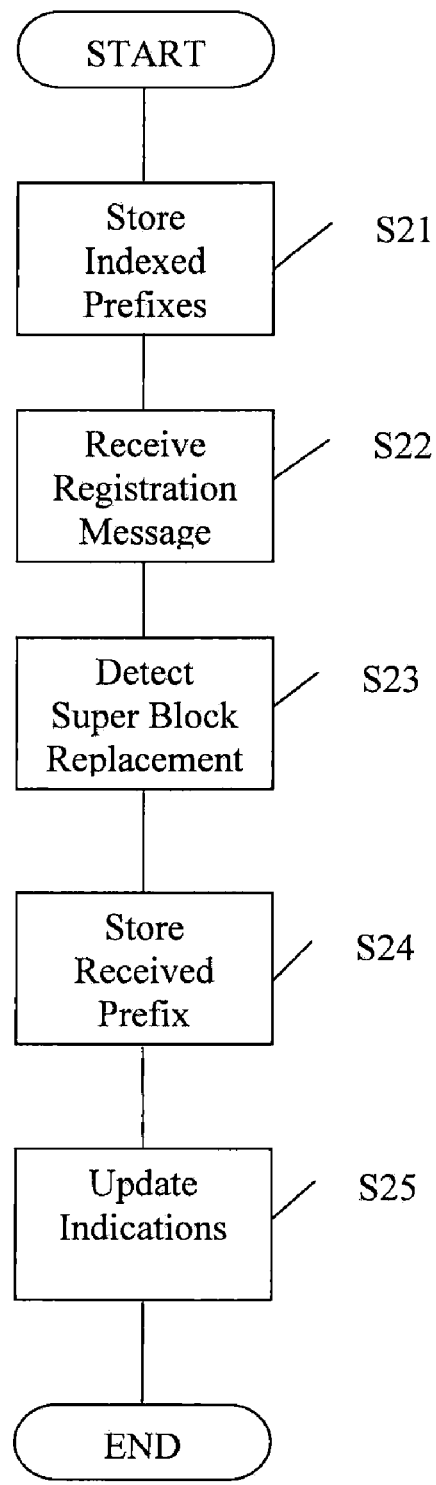
FIG. 8 is a flow diagram of a method according to another embodiment.

A method of replacing an existing super block prefix is disclosed in FIG. 8 and includes storing, in a memory, indexed prefixes (step S21), the prefixes being stored with an indication of whether they are super block prefixes. The method further includes receiving a registration message with at least one prefix (step S22) and detecting whether the received prefix is a super block to replace an existing super block (step S23). The received at least one prefix is stored in the memory with the indication (step S24), and the other indications in the memory are updated accordingly (step S25).

Although the embodiments have been described above with mobile networks and mobile IP, it is obvious for one skilled in the art that the embodiments may be implemented with any type of system in which IP prefixes or corresponding information are transmitted in signaling messages, such as messages advertising sets of destinations.

It will be obvious to a person skilled in the art that, as technology advances, the inventive concept can be implemented in various ways. The invention and its embodiments are not limited to the examples described above but may vary within the scope of the claims.

What is claimed is:

1. A method for forming a signaling message delivering prefix information, the method comprising:
   detecting that two or more prefixes have a common pattern;
   determining one of the prefixes as a super block prefix;
   truncating the super block prefix so that during truncating of the super block prefix starting from the left-hand side, zeros after the last number one in binary format are truncated, or starting from the right-hand side, octets having the value of zero are truncated until the first octet with the value of no zero;
   adding to the signaling message information on the super block prefix; and
   adding to the signaling message delta information on each remaining one or more prefixes amongst the two or more prefixes, the delta information indicating how the prefix differs from the super block prefix.

2. The method of claim 1, the method further comprising:
   adding the truncated super block prefix with length information and a flag indicating a super block as the information on the super block prefix.

3. The method of claim 1, wherein the delta information comprises a flag indicating a delta block, a delta comprising changed bits compared to the super block prefix and information indicating where the change is.

4. A method for forming a signaling message delivering prefix information, the method comprising:
 truncating a prefix so that during truncating of the prefix starting from the left-hand side, zeros after the last number one in binary format are truncated, or starting from the right-hand side, octets having the value zero are truncated until the first octet with the value of no zero; and
 adding to the signaling message information on the prefix, the information containing the truncated prefix and length information on the prefix.

5. A method for obtaining prefix information, the method comprising:
 receiving a signaling message comprising a truncated prefix and length information on the prefix; and
 reassembling the prefix received in the signaling message by taking into account that during truncating of the prefix starting from the left-hand side, zeros after the last number one in binary format are truncated, or starting from the right-hand side, octets having the value of zero are truncated until the first octet with the value of no zero.

6. A network node comprising:
 at least one processor;
 at least one memory including computer program code; and
 a memory configured to store prefixes indexed and with indication whether or not a prefix is a super block prefix;
 the at least one memory and the computer program code being configured to, with the least one processor, cause the network node at least to:
 store, in response to receiving a registration message from another entity, the registration message comprising one or more prefixes assigned to the entity, the received one or more prefixes to the memory with the indication;
 detect that two or more prefixes have a common pattern;
 determine one of the prefixes to be a super block prefix;
 update, in response to detecting that the received prefix is to be a super block replacing an existing super block, the indications in the memory;
 form a signaling message delivering prefix information, the means for forming being configured to add to the signaling message information on the super block prefix, and delta information on each remaining one or more prefixes amongst the two or more prefixes having a common pattern, the delta information indicating how the prefix differs from the super block prefix; and
 send the signaling message.

7. The network node of claim 6, wherein the at least one memory and the computer program code are further configured to, with the at least one processor, cause the network node to truncate the super block prefix, and to add the truncated super block prefix with length information and a flag indicating a super block as the information on the super block prefix.

8. The network node of claim 6, wherein the at least one memory and the computer program code are further configured to, with the at least one processor, cause the network node to calculate a delta comprising changed bits compared to the super block prefix, and to add to the signaling message as the delta information a flag indicating a delta block, the delta and information indicating where the delta locates.

9. The network node of claim 6, wherein the at least one memory and the computer program code are further configured to, with the at least one processor, cause the network node to form and send the signaling message in response to a received message requesting prefix information.

10. The network node of claim 6, wherein the network node is a home agent.

11. A telecommunications system comprising:
 a first network node configured to store prefixes, to detect that two or more prefixes have a common pattern, to determine one of the prefixes to be a super block prefix, to form a signaling message delivering prefix information, to truncate each remaining one or more prefixes amongst the two or more prefixes having a common pattern so that during truncating of a prefix starting from the left-hand side, zeros after the last number one in binary format are truncated, or starting from the right-hand side, octets having the value of zero are truncated until the first octet with the value of no zero; to add to a signaling message information on each remaining one or more prefixes amongst the two or more prefixes having a common pattern, information on a prefix containing the truncated prefix and length information on the prefix, and to send the signaling message; and
 a second network node configured to receive the signaling message and to reassembly the prefixes.

12. The telecommunications system of claim 11, wherein the first network node is further configured to truncate the super block prefix; and to add to the signaling message the truncated super block prefix with length information and a flag indicating a super block as the information on the super block prefix.

13. A system as claimed in claim 11, wherein the first network node is a home agent and the second network node is a router or a mobile router.

14. A non-transitory program storage medium configured to store computer program product comprising a computer-readable program instructions, wherein the execution of the computer program instructions in a node comprising a processor configured to execute the computer program product causes the node to carry out the functions of:
 detecting that two or more prefixes have a common pattern;
 determining one of the prefixes as a super block prefix;
 truncating the super block prefix so that during truncating of the super block prefix starting from the left-hand side, zeros after the last number one in binary format are truncated, or starting from the right-hand side, octets having the value of zero are truncated until the first octet with the value of no zero;
 adding to the signaling message information on the super block prefix; and
 adding to the signaling message delta information on each remaining one or more prefixes amongst the two or more prefixes, the delta information indicating how the prefix differs from the super block prefix.

15. The non-transitory program storage medium of claim 14, wherein the delta information comprises a flag indicating a delta block, a delta comprising changed bits compared to the super block prefix and information indicating where the change is.

16. A method comprising:
 storing in a memory prefixes indexed and with indication whether or not a prefix is a super block prefix, the super block prefix having a common pattern with at least one other prefix and being determined to be a super block prefix;
 receiving a registration message from another entity, the registration message comprising one or more prefixes assigned to the entity;
 detecting that the received prefix is to be a super block replacing an existing super block;

storing the received one or more prefixes to the memory with the indication; and updating, in response to the detecting, the indications in the memory.

17. A network node comprising;

at least one processor;

at least one memory including computer program code;

the at least one memory and the computer program code being configured to, with the at least one processor, cause the network node at least to:

truncate a prefix so that during truncating of the prefix starting from the left-hand side, zeros after the last number one in binary format are truncated, or starting from the right-hand side, octets having the value of zero are truncated until the first octet with the value of no zero; and add to a signaling message information on the prefix, the information containing the truncated prefix and length information on the prefix.

* * * * *